United States Patent
Herzberg et al.

(10) Patent No.: US 6,647,394 B1
(45) Date of Patent: Nov. 11, 2003

(54) DOING BUSINESS EMPLOYING LINKED TREES HAVING RETRIEVABLE EMBEDDED INFORMATION

(75) Inventors: Louis Paul Herzberg, Monsey, NY (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 09/590,206

(22) Filed: Jun. 8, 2000

Related U.S. Application Data

(60) Provisional application No. 60/138,172, filed on Jun. 8, 1999.

(51) Int. Cl.[7] ............................................. G06F 17/00
(52) U.S. Cl. ................................... 707/102; 707/101
(58) Field of Search ................................ 707/102, 101, 707/104.1; 345/700; 705/7, 30

(56) References Cited

U.S. PATENT DOCUMENTS

| | | | | |
|---|---|---|---|---|
| 5,999,192 A | * | 12/1999 | Selfridge et al. | 345/440 |
| 6,151,024 A | * | 11/2000 | Alimpich et al. | 345/357 |
| 6,151,582 A | * | 11/2000 | Huang et al. | 705/8 |
| 6,167,396 A | * | 12/2000 | Lokken | 707/3 |
| 6,185,576 B1 | * | 2/2001 | McIntosh | 707/200 |
| 6,281,896 B1 | * | 8/2001 | Alimpich et al. | 345/340 |
| 6,292,894 B1 | * | 9/2001 | Chipman et al. | 713/168 |
| 6,314,434 B1 | * | 11/2001 | Shigemi et al. | 707/203 |
| 6,381,711 B1 | * | 4/2002 | Chiang et al. | 714/48 |
| 6,415,298 B1 | * | 7/2002 | Oesterer et al. | 707/203 |

* cited by examiner

*Primary Examiner*—Uyen Le
(74) *Attorney, Agent, or Firm*—Scully, Scott, Murphy & Presser; Louis P. Herzberg

(57) ABSTRACT

A method and system for providing multilevel information about aspects of business. The method comprises the steps of generating a display, on a computer display screen, of a tree having a plurality of nodes, and embedding in the nodes information about said business aspects. For example, trees may be generated that provide information about arranging, performing, monitoring, maintaining and controlling a business. Information may be embedded with a matrix approach. As examples, matrices may be used that provide information about business models, business expansion capabilities, business short and long term predictions, business competitor data, comparison and differences, business histograms and predictors, business responsible entities, division, product, entity business plans, reporting and results, and business alarm functions.

41 Claims, 7 Drawing Sheets

| | JR's Plumbing | ACME Plumbing | McClains House of Fixtures |
|---|---|---|---|
| Sinks | | | |
| Showers | | Intersection of element 2 and element 2 — 4003 | |
| Water Heaters | | | |

4000 →
4002 — Catalogs of {Suppliers}
4001 — Catalogs of {Products}

| | JR's Plumbing | ACME Plumbing | McClains House of Fixtures |
|---|---|---|---|
| Sinks | | | |
| Showers | | Intersection of element 2 and element 2 — 4101 | |
| Water Heaters | | | |

4100

"Click" →

4102

ACME Plumbing - 3039 Cornwallis Rd.,
Durham, NC 27713
Contact: B.G. John 543-1234
Terms: 60 net ☐ Model 345   { } Quanity
☐ Model 348   { } Quanity
☐ Model 772   { } Quanity

FIG. 6
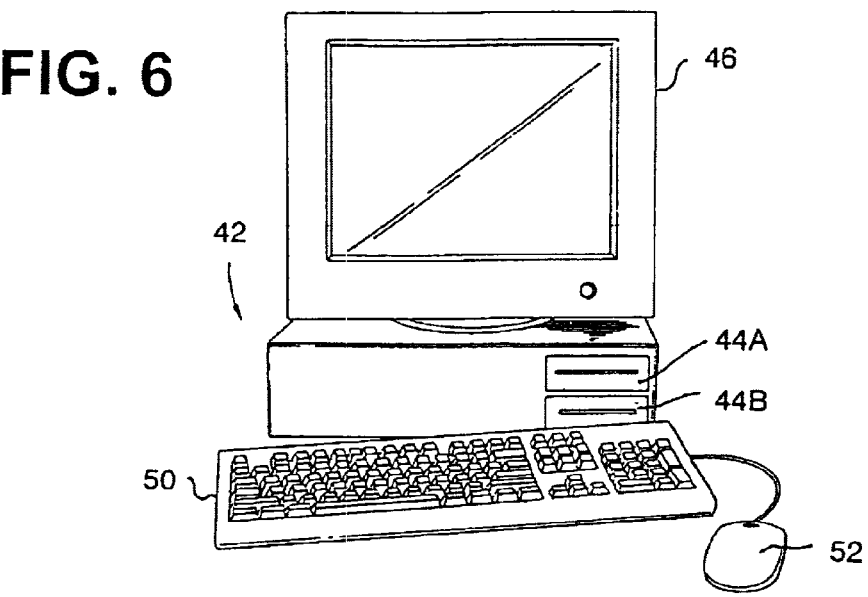
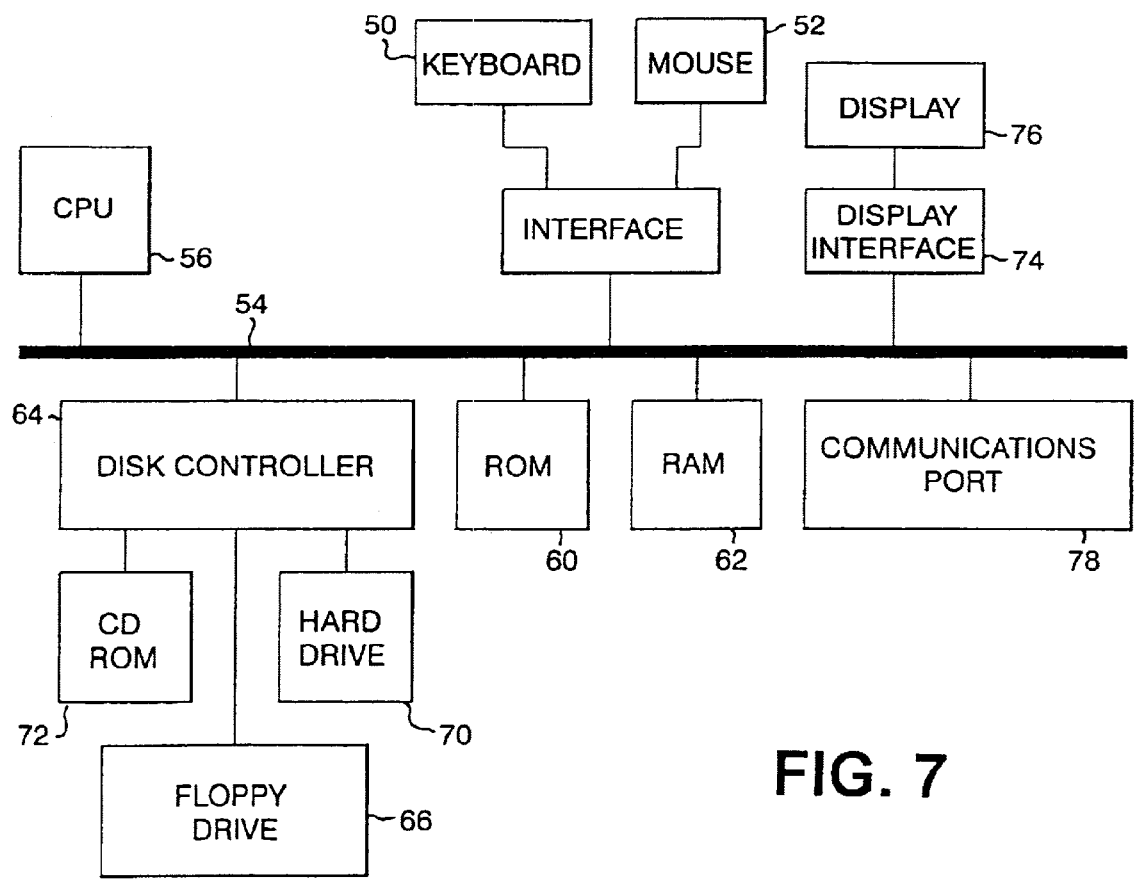
FIG. 7

DOING BUSINESS EMPLOYING LINKED TREES HAVING RETRIEVABLE EMBEDDED INFORMATION

CROSS REFERENCE

This application claims priority from U.S. Provisional Application No. 60/138,172, filed on Jun. 8, 1999.

This application is also related to the following copending applications, filed herewith, Serial No. 09/590,204, "Control And Maintenance Of Multicast Distribution Employing Embedded Displays,"

Serial No. 09/590,205, "Controlling, Configuring, Storing, Monitoring And Maintaining Accounting Or Bookkeeping Information Employing Trees With Nodes Having Embedded Information,"

Serial No. 09/590,323, A Method Of Control, Maintenance And Allocation Of Computer Server Farms Resources And Other Resource Farms To Their Users," and Serial No. 09/590,203, "Video-On-Demand configuring, Controlling And Maintaining,"

which are all incorporated herein by reference in entirety.

This application is also cross referenced with application Ser. No. 09/327,708, entitled, "Representing, Configuring, Administering, Monitoring, and/or Modeling Connections Using Catalogs and Matrixes," by E. H. Booth et al., filed Jun. 8, 1999, the disclosure of which is incorporated herein by reference in entirety;

The disclosure of this application is related to the disclosures of the following U.S. Patents:

U.S. Pat. No. 5,289,460, "Maintenance of Message Distribution Trees in a Communications Network," by Drake, Jr. et al., issued Feb. 22, 1994;

U.S. Pat. No. 5,724,646, "Fixed video-on-demand," by A. Ganek et al., issued Mar. 3, 1998;

U.S. Pat. No. 5,682,597, "Hybrid Video-on-demand Based on a Near-video-on-demand System," by A. Ganek et al., issued Oct. 28, 1997;

U.S. Pat. No. 5,459,725, "Reliable Multicasting over Spanning Trees in Packet Communications Networks," by Bodner, R. A. et al., issued Oct. 17, 1995;

U.S. Pat. No. 4,277,837, "Personal Portable Terminal for Financial Transactions," by Stuckert, P. E., issued Jul. 7, 1981;

U.S. Pat. No. 4,106,667, "Apparatus and Method for Conducting Financial Transactions," by Lynott, J. J., issued Aug. 15, 1978;

which are all incorporated herein by reference in entirety.

BACKGROUND OF THE INVENTION

This invention generally relates to business information; and, more specifically, the invention relates to the use of computer displays having business information embedded therein.

The many facets of a business are generally set up and performed employing a mixture of applications. Each application satisfies a particular business aspect and/or attribute. Each aspect has a unique display containing a limited amount of business information. It would be advantageous to have a single application which enables display of multiple aspects in a logical way allowing ease of use for adding, deleting and modifying products and product lines, product development cycles, schedules (critical paths), parts, customer, sales, expenditure, employee information and databases. It would be most useful if parts of these different aspects can be linked in the display.

SUMMARY OF THE INVENTION

An aspect of this invention is to employ a plurality of tree displays having business information embedded therein.

Another aspect of the present invention is to employ a plurality of tree displays having business information embedded therein, and to provide linkage between trees and/or their nodes.

A aspect of this invention is to provide simultaneous display of a plurality of portions or entire trees that have business information embedded therein.

Another aspect of the present invention is to employ multidimensional matrices to show relationships of multi-dimensionally related business aspects.

These and other aspects are attained with a method and system for providing multilevel information about aspects of business. The method comprises the steps of generating a display, on a computer display screen, of a tree having a plurality of nodes, and embedding in the nodes information about said business aspects. For example, trees may be generated that provide information about arranging, performing, monitoring, maintaining and controlling a business.

Information may be embedded with a matrix approach. As examples, matrices may be used that provide information about business models, business expansion capabilities, business short and long term predictions, business competitor data, comparison, and differences, business histograms and predictors, business responsible entities, division, product, entity business plans, reporting and results, and business alarm functions.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 illustrates a display of embedded business relationship information.

FIG. 5 shows a display resulting from activation of a cell of the matrix of FIG. 4.

FIGS. 6 and 7 show a computer system that may be used in the invention.

DETAILED DESCRIPTION OF THE PREFERRED EMBODIMENTS

Figure 1:
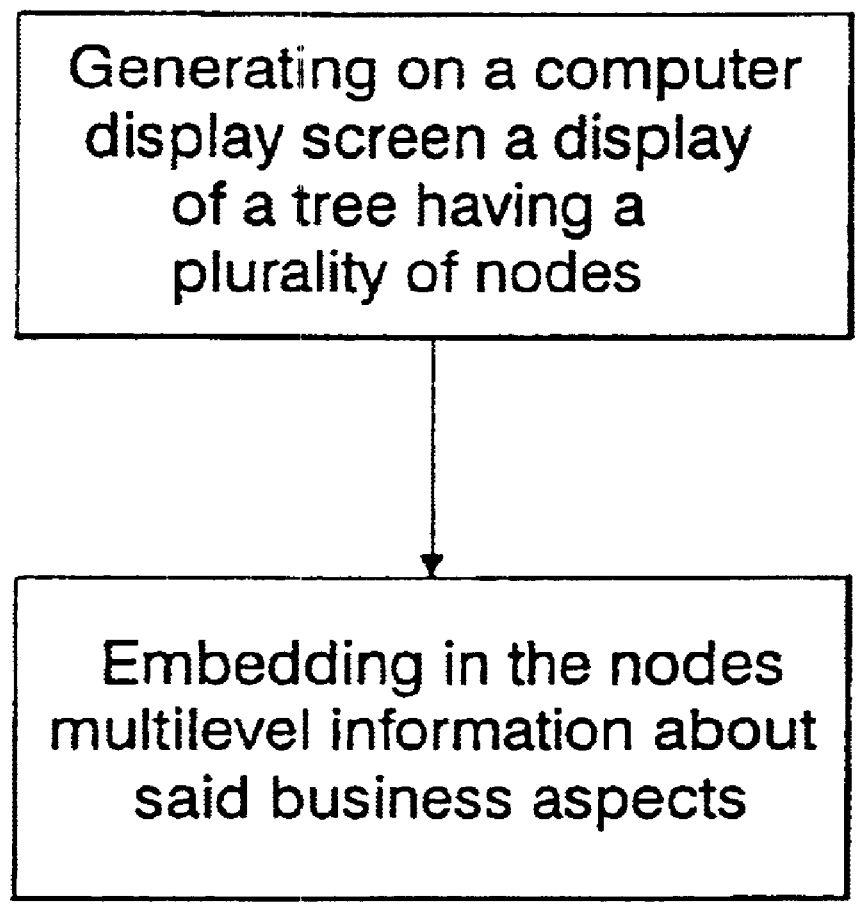
FIG. 1 is a flow chart outlining a preferred method embodying this invention.
Figure 2:
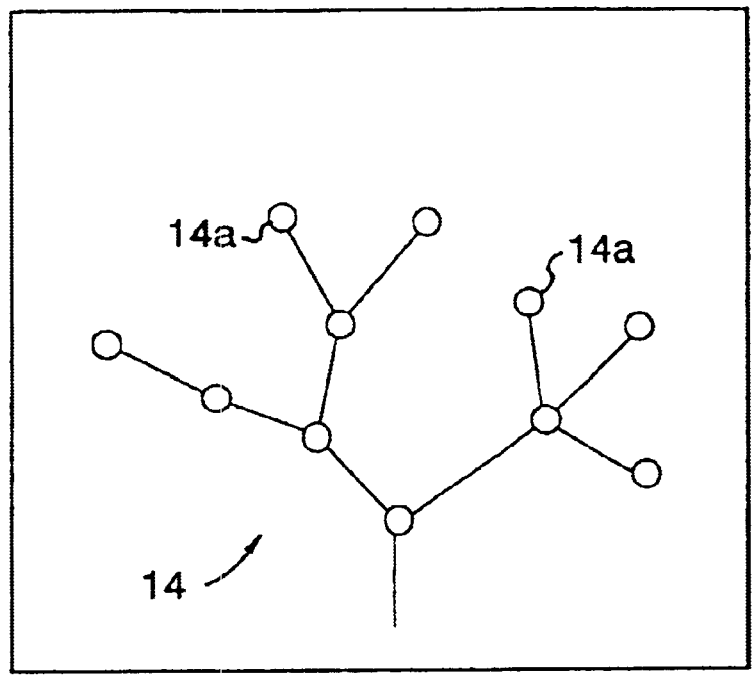
FIGS. 2 and 3 show displays of trees having nodes with embedded information.
Figure 3:
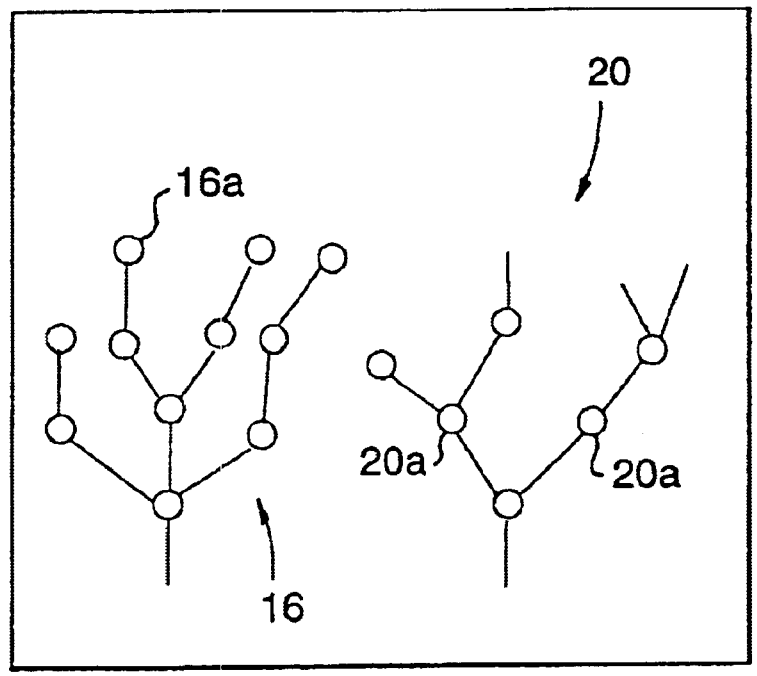

With reference to FIGS. 1–3, this invention employs a display 10, 12 showing a plurality of trees 14, 16, 20 for arranging, performing, monitoring maintaining and controlling a business employing trees with embedded information. Each tree is a representation of its nodes 14a, 16a, 20a for an embodiment of a business. The tree enables viewing embedded information regarding each nodes on each of the trees. Each node is provided with embedded information relevant to its embodiment or attribute.

Although the trees in FIGS. 2 and 3 are shown bottom up (extending upward from the root node), trees may similarly be formed and/or displayed top down (extending downward from the root node), sideways (from the root node) or in any combination of these (as known to those skilled in the art). The particular tree formation and/or display is formed as is best suited to the particular application and/or display, and in accordance with the desire of a viewer or user. In some embodiments these display variations are selectable by the user. When more than one tree is displayed (e.g. in a split screen utilization), each tree may be formed and/or displayed in a different form/shape.

In one embodiment, this invention provides linkage between trees and/or their nodes that display information that may be cross referenced from one tree to another. For example, linking a sales tree with a product tree and/or a regional area tree.

In accordance with one embodiment, as particularly shown in FIG. 3, this invention provides simultaneous display of a plurality of portions or entire trees. The simultaneous display is optionally provided as overlays in different colors, intensities, and/or line width or shape. Optionally, the trees may share different areas of the display and/or windows toggled. In a split display area option, lines of different colors, shapes and/or intensities are shown to indicate particular linkages between nodes on the different trees. In one embodiment, the invention employs multidimensional matrices to show relationships of multidimensionally related embodiments, e.g. sales, regions, products, revenue. Matrices are useable to configure, maintain, analyze, develop statistics, schedule, monitor, model, connect and administer the embodiments of a business using catalogs and matrices.

In one embodiment of the invention, multidimensional relationships are viewable using known techniques of multidimensional viewing, and/or viewing a particular combination of two or three of the dimensions according to a user's selection for viewing.

It should be noted that the above-mentioned embodiments of the invention are also usable in other technology areas to employ tree representations having nodes with embedded information.

In accordance with another embodiment of the invention, the processes used by the business are represented by nodes in the tree. The order of the nodes represents the order of the processes used in the business. This order relationship is used to support critical path analysis of the business as a whole. It is also used to understand information flow. This is in regard to both understanding and/or analyzing which business processes are linked via information flow, and understanding and/or analyzing the content of the information that passes between each business process. This, in turn is useful to tune the system for increased efficiency, or to display an informational model of the business itself. This informational model represented by the tree of business processes is useful to database designers in creating the best database that will support the business system, e.g., order entry/inventory/production/raw materials procurement processes have an information flow that can influence the database design.

One embodiment allows the display of embedded business relationship information. In FIG. 4, the matrix, 4000, shows a catalog of products, 4001 that the business uses and a catalog of suppliers, 4002 that have a business relationship to the business for the supply or sale of the elements in the product catalog. If one were to activate the cell at a matrix intersection, 4003, one could see, for example, FIG. 5. In FIG. 5, the imbedded information represented by the intersection, 4101 is shown in 4102. In this example, the business contact information is shown and the ability to indicate the exchange of certain products between the business.

A similar group of business information includes matrixes and/or elements of information regarding and/or representing: business model; business expansion capabilities; business short and long term predictions; business competitor data; comparisons and differences; business histograms and predictors; business responsible parties/entities; division, product, entity business plan, reporting and results; business alarm functions; etc.

As will be understood by those of ordinary skill in the art, any suitable processor, computer or computer network may be used in the practice of the present invention. For example, software for performing the invention may be embedded in a processor. Alternately, dedicated hardware may be used to practice the invention.

A computer or computer network may also be used to in the practice of this invention; and FIG. 6 illustrates, as an example, a computer of a type that may be used in the practice of this invention. Viewed externally in FIG. 6, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

FIG. 7 shows a block diagram of the internal hardware of the computer of FIG. 6. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 8:
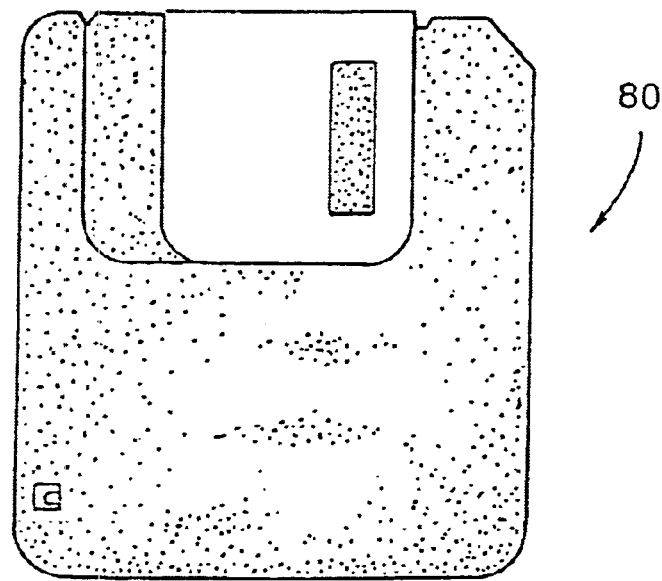
FIG. 8 illustrates a memory medium that can be used to hold a computer program for carrying out this invention.

FIG. 8 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

Figure 9:
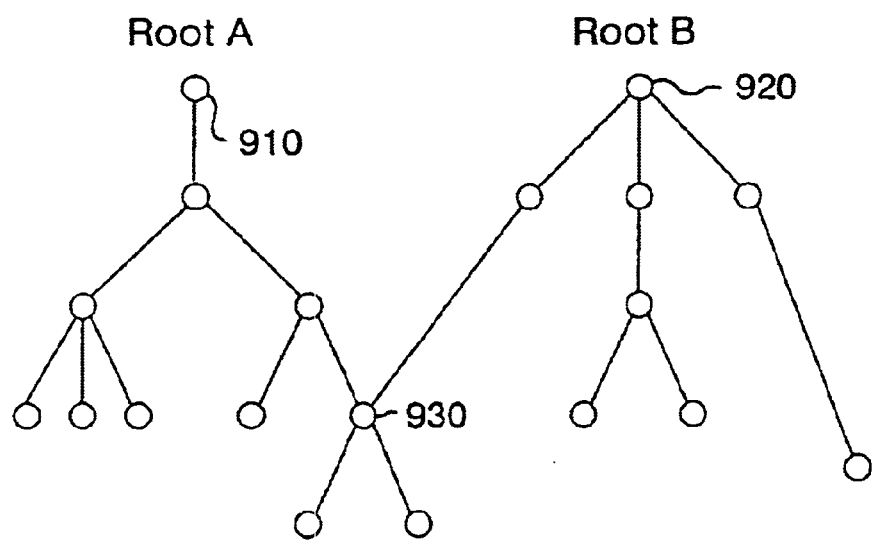
FIG. 9 shows an alternate tree display.

In some embodiments a tree may have more than one so called root node, as shown in FIG. 9. The elements/nodes emanating from each of the plurality of roots 910 and 920 may be common and be ultimately connected to each root at any subsequent tree level as appropriate to the application. Thus node 930 is shown to be ultimately connected to root-A 910 and root-B 920. An example of this occurs when root-A 910 represents corporate division-A and root-B 920 represents corporate division-B, and node 930 represent the costs of a shared legal department.

Some embodiments provide for any combination of the following capabilities: matrix and/or element expansion; logical set manipulation of catalog elements to form changed and/or new matrices, changed and/or new elements, and/or changed and/or new catalogs; catalog manipulation an/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

Figure 10:
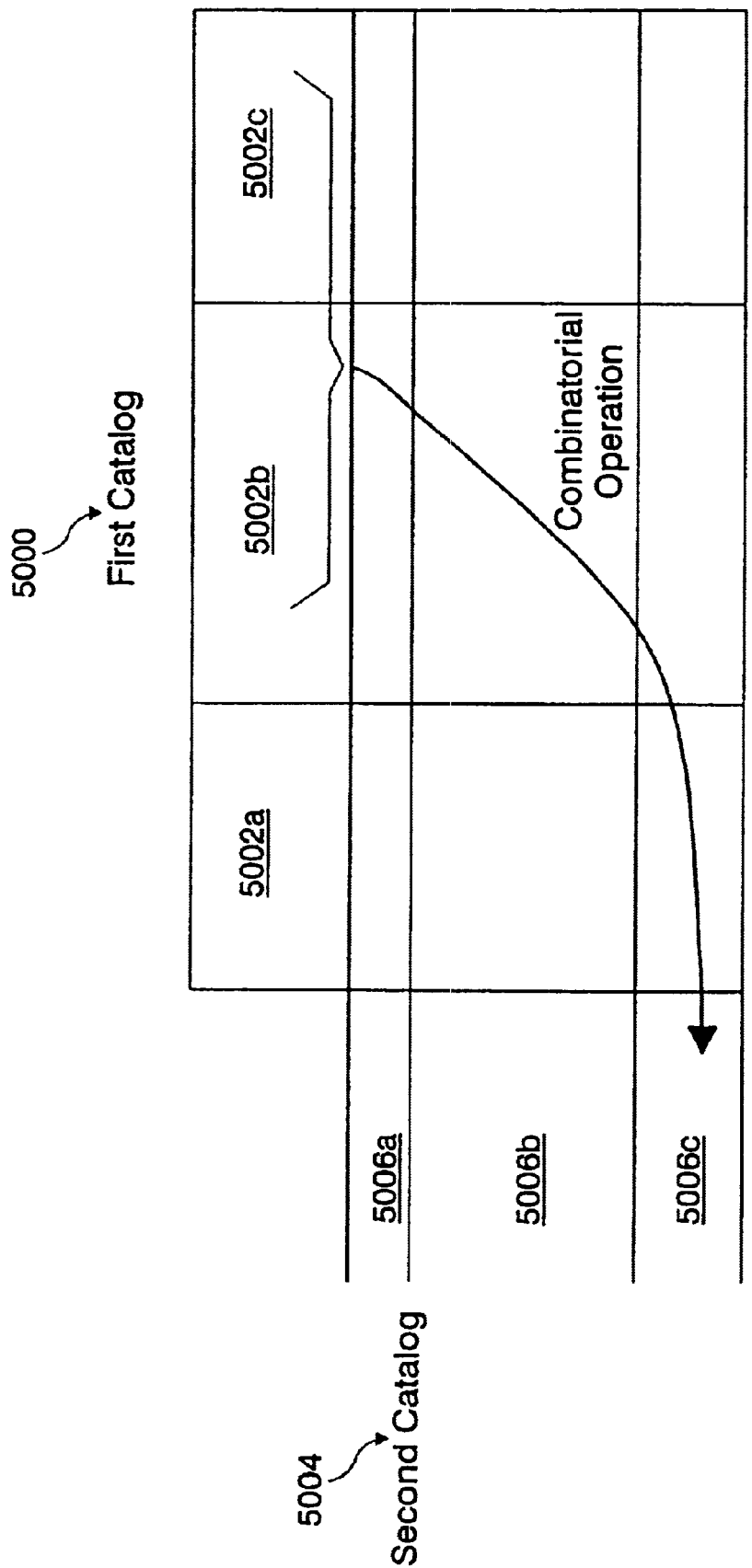
FIG. 10 illustrates an aspect of the invention in which combinatorial operations are used to form elements of a catalog.

Also, the present invention may be embodied in a method for representing interconnection of a plurality of elements of a system providing information of a plurality of aspects of doing business. With reference to FIG. 10, the method comprises providing a first catalog 5000 for a first subset of said elements, represented, for example at 5002a, 5002b and 5002c, and providing a second catalog 5005 for a second subset of said elements, represented, for example, at 5006a, 5006b and 5006c; and creating a matrix of connection cells formed by an intersection of a pair of elements, wherein a first element of each pair is taken from the first catalog and a second element of each pair is taken from the second catalog. The method comprises the further step of forming a connection representation for at least a subset of the pairs; wherein at least a portion of one of the catalogs is formed using combinatorial operations upon elements of the other of the catalogs.

While it is apparent that the invention herein disclosed is well calculated to fulfill the embodiments stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of providing multilevel information about aspects of business, comprising the steps of:

generating on a computer display screen a display of a tree having a plurality of nodes, said tree including a root node, one or more sterns extending outward from the root node to one or more first nodes, one or more additional stems extending outward from each of the first nodes to one or more second nodes, the plurality of stems extending in different directions, said nodes being dispersed over the display screen; and embedding in the nodes multilevel information about said business aspects;

wherein the embedding step includes the step of obtaining said multilevel information about said business aspects from a matrix representing interconnections of a plurality of elements of a system, including the steps of:

providing a first catalog for a first subset of said elements, and providing a second catalog for a second subset of said elements;

creating said matrix from connection cells formed by an intersection of a pair of elements, wherein a first element of each pair is taken from the first catalog and a second element of each pair is taken from the second catalog; and forming a connection representation for at least a subset of the pairs; wherein at least a portion of one of the catalogs is formed using combinatorial operations upon elements of the other of the catalogs.

2. A method according to claim 1, wherein the tree provides information about an aspect of business selected from the group comprising:

arranging, performing, monitoring, maintaining and controlling a business.

3. A method according to claim 1, wherein the generating step includes the steps of:

generating a plurality of trees, each tree having a plurality of nodes; and providing linkage between the trees so that information can be cross referenced from one tree to another.

4. A method according to claim 1, wherein We the matrix has columns and rows identifying accounting attributes.

5. A method according to claim 4, wherein the first catalog is a catalog of products that a business uses and the second catalog is a catalog of suppliers that have a business relationship to the business for the supply of or sale of the elements in the product catalog.

6. A method according to claim 4, wherein the matrix contains information about aspects of business selected from the group comprising:

business models, business expansion capabilities, business short and long term predictions, business competitor data, comparisons and differences, business histograms and predictors, business responsible entities, division, product, entity business plans, reporting and results, and business alarm functions.

7. A system for providing multilevel information about aspects of business, comprising:

a computer display screen;

means for generating on the computer display screen a display of a tree having a plurality of nodes, said tree including a root node, one or more stems extending outward from the root node to one or more first nodes, one or more additional stems extending outward from each of the first nodes to one or more second nodes, the plurality of stems extending in different directions, said nodes being dispersed over the display screen; and means for embedding in the nodes multilevel information about said business aspects;

wherein the means for embedding includes means for obtaining said multilevel information about said business aspects from a matrix representing interconnections of a plurality of elements of a system, including:

a first catalog for a first subset of said elements, and a second catalog for a second subset of said elements;

a matrix of connection cells formed by an intersection of a pair of elements, wherein a first element of each pair is taken from the first catalog and a second element of each pair is taken from the second catalog; and a connection representation for at least a subset of the pairs; wherein at least a portion of one of the catalogs is formed using combinatorial operations upon elements of the other of the catalogs.

8. A system according to claim 7, wherein the tree provides information about an aspect of business selected from the group comprising:

arranging, performing, monitoring, maintaining and controlling a business.

9. A system according to claim 7, wherein the generating means includes:
   means for generating a plurality of trees, each tree having a plurality of nodes; and
   means for providing linkage between the trees so that information can be cross referenced from one tree to another.

10. A system according to claim 7, wherein the matrix has columns and rows identifying accounting attributes.

11. A system according to claim 10, wherein the first catalog is a catalog of products that a business uses and the second catalog is a catalog of suppliers that have a business relationship to the business for the supply of or sale of the elements in the product catalog.

12. A system according to claim 10, wherein the matrix contains information about aspects of business selected from the group comprising: business models, business expansion capabilities, business short and long term predictions, business competitor data, comparisons and differences, business histograms and predictors, business responsible entities, division, product, entity business plans, reporting and results, and business alarm functions.

13. A program storage device readable by machine, tangibly embodying a program of instructions executable by the machine to perform method steps for displaying multilevel information about aspects of business, said method steps comprising:
   generating on a computer display screen a display of a tree having a plurality of nodes, said tree including a root node, one or more stems extending outward from the root node to one or more first nodes, one or more additional stems extending outward from each of the first nodes to one or more second nodes, the plurality of stems extending in different directions, said nodes being dispersed over the display screen; and
   embedding in the nodes multilevel information about said business aspects;
   wherein the embedding step includes the step of obtaining said multilevel information about said business aspects from a matrix representing interconnections of a plurality of elements of a system, including the steps of:
      providing a first catalog for a first subset of said elements, and providing a second catalog for a second subset of said elements;
      creating said matrix from connection cells formed by an intersection of a pair of elements, wherein a first element of each pair is taken from the first catalog and a second element of each pair is taken from the second catalog; and
      forming a connection representation for at least a subset of the pairs; wherein at least a portion of one of the catalogs is formed using combinatorial operations upon elements of the other of the catalogs.

14. A program storage device according to claim 13, wherein the tree provides information about an aspect of business selected from the group comprising:
   arranging, performing, monitoring, maintaining and controlling a business.

15. A program storage device according to claim 13, wherein the generating step includes the steps of:
   generating a plurality of trees, each tree having a plurality of nodes; and
   providing linkage between the trees so that information can be cross referenced from one tree to another.

16. A program storage device according to claim 13, wherein said matrix has columns and rows identifying accounting attributes.

17. A program storage device according to claim 16, wherein the first catalog is a catalog of products that a business uses and the second catalog is a catalog of suppliers that have a business relationship to the business for the supply of or sale of the elements in the product catalog.

18. A program storage device according to claim 16, wherein the matrix contains information about aspects of business selected from the group comprising:
   business models, business expansion capabilities, business short and long term predictions, business competitor data, comparisons and differences, business histograms and predictors, business responsible entities, division, product, entity business plans, reporting and results, and business alarm functions.

19. A method as recited in claim 1, wherein the free is displayed top down.

20. A method as recited in claim 1, wherein the tree has at least two root nodes.

21. A method as recited in claim 20, wherein at least two of the root nodes have connectivity to at least one node in common.

22. A method as recited in claim 21, wherein said at least one node in common includes business groups that have been combined based on a combining criteria.

23. A method as recited in claim 21, wherein the combining criteria includes criteria selected from criteria including: similar product line, common geographic location, similar operating habits, similar operating statistics, in a common communications network, common executives, and similar scheduling habits.

24. An article of manufacture comprising a computer usable medium having computer readable program code means embodied therein for causing provision of multilevel information about relationships between users and aspects of doing business, the computer readable program code means in said article of manufacture comprising computer readable program code means for causing a computer to effect the steps of claim 1.

25. A method for representing interconnection of a plurality of elements of a system providing information of a plurality of aspects of doing business, the method comprising:
   providing a first catalog for a first subset of said elements, and providing a second catalog for a second subset of said elements;
   creating a matrix of connection cells formed by an intersection of a pair of elements, wherein a first element of each pair is taken from the first catalog and a second element of each pair is taken from the second catalog; and
   forming a connection representation for at least a subset of the pairs; wherein at least a portion of one of the catalogs is formed using combinatorial operations upon elements of the other of the catalogs.

26. A method as recited in claim 25, wherein at least one element is a catalog of sub-elements, and the method further comprises the step of including all sub-elements in the matrix.

27. A method as recited in claim 25, wherein at least one of the catalogs includes a plurality of sub-catalogs.

28. A method as recited in claim 25, further comprising displaying at least one portion of the matrix.

29. A method as recited in claim 25, further comprising employing a wizard to form at least a subset of the elements.

30. An article of manufacture comprising a computer usable medium having computer readable program code means embodied therein for causing representation of interconnection of a plurality of elements of a business aspect system, the computer readable program code means in said article of manufacture comprising computer readable program code means for causing a computer to effect the steps of claim 25.

31. An architecture comprising:
a matrix module forming a business aspect information system matrix having at least one matrix row element and at least one matrix column element, an intersection of each said at least one matrix row element with each said at least one matrix column element forming a matrix cell;
a set of business aspect elements, a first subset of said set having a connection requirement with a second subset of said set;
a first catalog including at least one business aspect element forming said at least one matrix row element; and
a second catalog including at least one business aspect element forming said at least one matrix column element, wherein each matrix cell represents a business aspect connection between each business aspect element of the first catalog and each business aspect element of the second catalog to enable systematic cooperation among business aspect elements according to a business aspect requirement; wherein at least a portion of one of the catalogs is formed using combinatorial operations upon elements of the other of the catalogs.

32. An architecture as recited in claim 31, wherein at least one business aspect element is a catalog of business aspect sub-elements.

33. An architecture as recited in claim 31, wherein at least one of the catalogs is a catalog of elements only peripherally related to business aspect.

34. An architecture as recited in claim 33, wherein the catalog of elements only peripherally related to business aspect includes an item selected from the group of items including business division or business customer habits, business customer credit card and/or internet purchases, customer's business friends, and customer product data.

35. A method of providing multilevel information about a plurality of business aspects related entities and resources, comprising the steps of:
generating on a computer display screen a display of a tree having a plurality of nodes, said tree including a root node, one or more stems extending outward from the root node to one or more first nodes, one or more additional stems extending outward from each of the first nodes to one or more second nodes, the plurality of stems extending in different directions, said nodes being dispersed over the display screen; and
embedding in the nodes multilevel information about said business aspects;
wherein the embedding step includes the step of obtaining said multilevel information about said business aspects from a matrix representing interconnections of a plurality of elements of a system, including the steps:
providing a first catalog for a first subset of said elements, and providing a second catalog for a second subset of said elements;
creating said matrix from connection cells formed by an intersection of a pair of elements, wherein a first element of each pair is taken from the first catalog and a second element of each pair is taken from the second catalog; and
forming a connection representation for at least a subset of the pairs; wherein at least a portion of one of the catalogs is formed using combinatorial operations upon elements of the other of the catalogs.

36. A method as recited in claim 35, wherein the plurality of business aspect related entities and resources include an entity and/or resource selected from: business aspect providers; business aspect maintainers/monitors; business aspect related information sellers; business aspect databases and/or applications; and any combination of the above.

37. An article of manufacture comprising a computer usable medium having computer readable program code means embodied therein for causing provision of multilevel information about relationships between users and items of a plurality of business aspect related entities and resources, the computer readable program code means in said article of manufacture comprising computer readable program code means for causing a computer to effect the steps of claim 35.

38. An article of manufacture as recited in claim 37, wherein the business aspect resources include holdings of groups of business aspect related products.

39. An article of manufacture as recited in claim 37, wherein the relationships include business aspect monitoring information.

40. A method as recited in claim 1, further comprising implementing at least one process taken from a group of processes including: matrix and/or element expansion; logical set manipulation of catalog elements to form changed and/or new matrices, changed and/or new elements, and/or changed and/or new catalogs; catalog manipulation and/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

41. A method as recited in claim 25, further comprising implementing at least one process taken from a group of processes including: matrix and/or element expansion; logical set manipulation of catalog elements to form changed and/or new matrices, changed and/or new elements, and/or new catalogs; catalog manipulation and/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

* * * * *

UNITED STATES PATENT AND TRADEMARK OFFICE
CERTIFICATE OF CORRECTION

PATENT NO.   : 6,647,394 B1
DATED        : November 11, 2003
INVENTOR(S)  : Louis P. Herzberg et al.

Page 1 of 1

It is certified that error appears in the above-identified patent and that said Letters Patent is hereby corrected as shown below:

<u>Column 1,</u>
Line 25, after "with" insert -- copending --

<u>Column 5,</u>
Line 50, "sterns" should read -- stems --

<u>Column 6,</u>
Line 18, delete "We"

<u>Column 8,</u>
Line 15, "free" should read -- tree --

Signed and Sealed this

Sixth Day of April, 2004

JON W. DUDAS
*Acting Director of the United States Patent and Trademark Office*